2,823,058
MULTIPLE ELEMENT SEALING RING

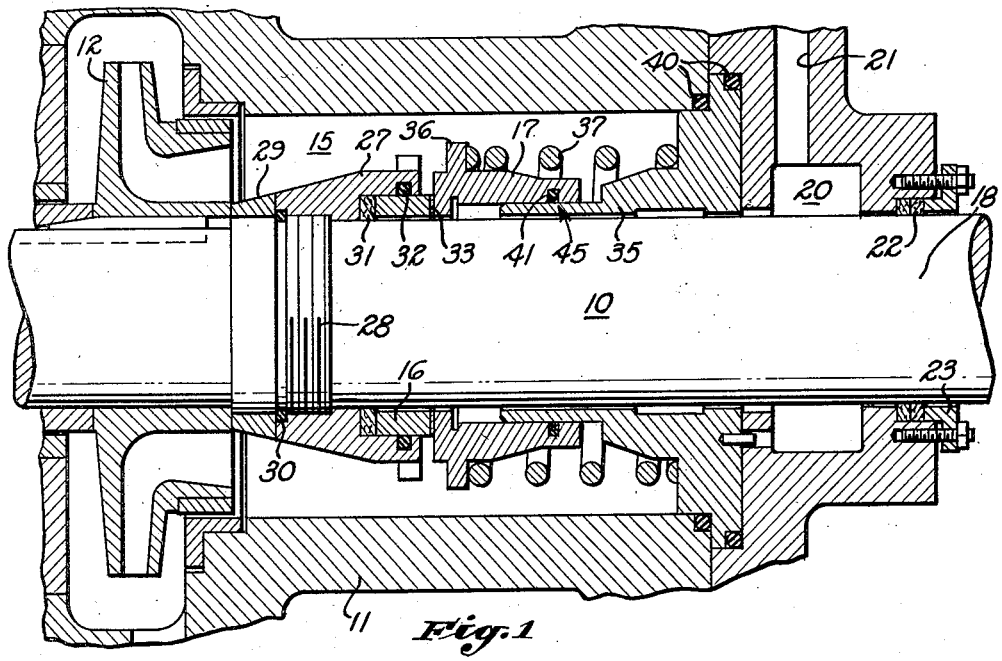
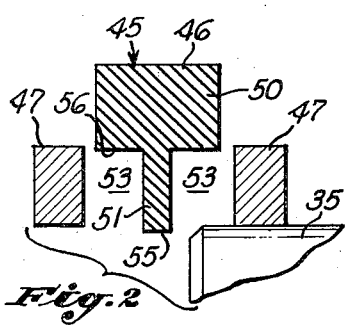
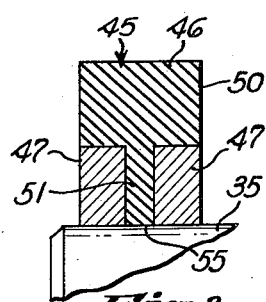
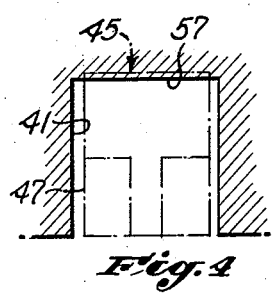
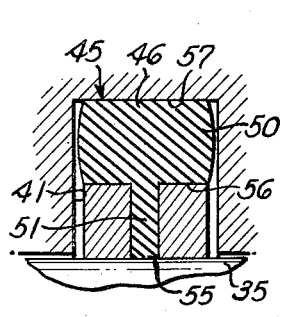
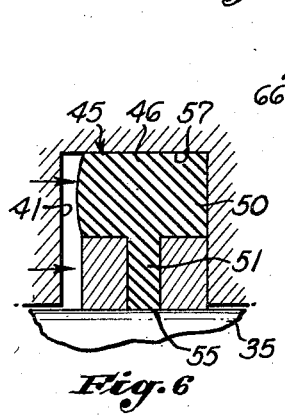
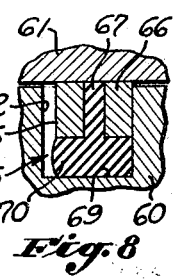
INVENTORS:
MURRY F. ECKER
DORAN B. HARNEY

Murry F. Ecker, Downey, and Doran B. Harney, Compton, Calif., assignors, by mesne assignments, to Dresser Industries, Inc., Dallas, Tex., a corporation of Delaware Application November 17, 1952, Serial No. 320,906

6 Claims. (Cl. 288—16)

This invention relates to sealing rings of the type that is commonly used in a circumferential groove in a sealing assembly for preventing fluid flow along a shaft, or the like, and is directed to a multiple element sealing ring for this purpose.

The type of sealing assembly in which the invention is being initially embodied is a well known combination of three annular bodies, namely: a fixed sleeve surrounding the shaft that is to be sealed with respect to longitudinal fluid flow; a first nonrotating annular sealing member, commonly termed a follower, that is slidingly telescoped on the sleeve and provides one of the two required sealing faces surrounding the shaft; and finally, a second annular sealing member that is carried by the shaft for rotation therewith and provides a second sealing face to match the sealing face of the first annular sealing member, the follower usually being biased toward the second annular sealing member by fluid pressure and a suitable spring.

A suitable annular sealing ring, often in the form of an O-ring, is provided between the sleeve and the follower. Usually, the O-ring is mounted in an inner circumferential groove of the follower to embrace the sleeve and to be carried along the sleeve by movement of the follower.

It is essential that the sealing ring slide along the sleeve with sufficient ease to permit the follower to maintain sealing contact with the second annular sealing member that rotates with the shaft.

In such a sealing assembly, the second annular sealing member is shifted axially by high pressures because of outward axial movement of the shaft against a thrust bearing, or the like, and because of actual axial compression of the shaft. In a typical installation having an operating pressure between 2500 and 3000 p. s. i., the axial shift of the rotary sealing member carried by the shaft may be on the order of .012", the shift being axially outward by this amount whenever the fluid pressure is applied and axially inward by the same amount whenever the fluid pressure is removed.

This shift of the second annular sealing member would not affect the effectiveness of the sealing assembly if the follower on the stationary sleeve would shift correspondingly and synchronously in both of the two directions to maintain the desired sealing relation between the two sealing faces. However, the spring pressure, plus any prevailing differential fluid pressure that urges the follower toward its starting position, is much less than the tremendous force on the shaft that causes the outward shift.

We have discovered that this lower return axial force, which is especially low in the initial period of building up pressure after a shut down, very often fails to shift the follower toward the annular sealing member on the shaft. The basic difficulty is that the sealing ring carried by the groove in the follower adheres too tenaciously to the sleeve to permit the required relative axial movement between the follower and the sleeve and the degree of such adherence increases with the length of time the sealing ring remains in a particular position.

The present invention solves this problem by providing a low friction, multiple element sealing ring that may be used in place of the usual O-ring. The new multiple element sealing ring is characterized by such low frictional resistance to sliding movement along the fixed sleeve that it makes the follower sensitive even to minor pressure changes. Consequently the follower maintains effective sealing contact at all times with the rotary sealing member carried by the shaft.

The reduction of friction to the extent required to make the invention effective for its special purpose is achieved first by reducing the area of the elastomer material in sealing contact with the periphery of the fixed sleeve and second by adding auxiliary rings of special low friction material to compensate for the reduced area of contact by the elastomer.

In a preferred practice of the invention, the elastomer body is a ring of T-shaped cross-sectional configuration having a transverse backing portion or band portion to lie against the bottom of the annular groove in the follower and having integral therewith a central, relatively thin radial web directed outward from the groove toward the periphery of the fixed sleeve. The T-shaped configuration provides two annular recesses which are occupied by two side rings of the low friction material.

A feature of the invention is the dimensioning of the T-ring and the two auxiliary side rings relative to each other, both relative to the groove in the follower and relative to the circumference of the fixed sleeve to cause the three members to function together as a unitary high pressure seal. In this regard, the unrestrained dimensions of the three members are important, i. e., the dimensions of each of the three members apart from the others, apart from the groove in the follower and apart from the surface of the fixed sleeve. As will be pointed out, the relative unrestrained dimensions in the preferred form of the invention are such that the T-ring is both compressed radially by the bottom of the groove in the follower and is expanded radially by the fixed sleeve. Moreover, the backing portion of the T-ring that embraces the two auxiliary rings is dimensioned to exert radial contractive force on the two side rings to cause the two side rings in turn to fit snugly around the fixed sleeve.

The features and advantages of the invention will be readily understood from the following detailed description together with the accompanying drawing.

In the drawing, which is to be regarded as merely illustrative,

Fig. 1 is a sectional view of a sealing assembly incorporating a preferred embodiment of the invention;

Fig. 2 is a sectional view on an enlarged scale of the T-ring and the two side rings showing their unrestrained dimensions relative to the fixed sleeve along which the three members slide in a fluid-sealing manner;

Fig. 3 is a similar view showing how the three members cooperating as a unit will fit around a fixed sleeve in the absence of the grooved follower;

Fig. 4 is a diagrammatic view of the same character showing the dimensions and configurations of the three members in Fig. 3 relative to the dimension and configuration in cross section of a groove in a follower in which the three members are to be mounted;

Fig. 5 is a cross-sectional view on the same scale showing the three members mounted in the follower groove with consequent distortion or deformation of the T-ring;

Fig. 6 is a view similar to Fig. 5 showing the effect of high fluid pressure against one face of the multiple-element sealing ring;

Fig. 7 shows the three members of a second form of the multiple-element sealing ring for use in an outer circumferential groove instead of an inner circumferential groove; and Fig. 8 is a cross-sectional view of the second form of the invention mounted in an outer circumferential groove.

Fig. 1 shows, by way of example, how the invention may be embodied in a sealing assembly for a shaft 10 that actuates impeller means in a boiler circulating pump, which pump is not shown in the drawing. An extension of the pump casing, designated by numeral 11, encloses an auxiliary circulating means 12 for the fluid under pressure and forms an annular space 15 around the shaft 10 in which the confined fluid is under exceedingly high pressure. The pressure may, for example, range upward from 2000 p. s. i.

A pair of annular sealing members 16 and 17 have suitable opposed faces that cooperate to seal off the high pressure annular space 15 from the outer end portion 18 of the shaft 10. Radially inward leakage, which is controlled at an acceptably low rate, moves along the shaft 10 to an annular drainage space 20 from which it is discharged through a passage 21 in the wall of the casing 11. Suitable packing 22 retained by a gland 23 embraces the shaft 10 to seal off the annular drainage space 20 from the exterior of the casing.

The annular sealing member 16 rotates with the shaft 10 and may be in the form of a ring of sintered tungsten carbide that is held on the rotating shaft by a suitable retaining sleeve 27. The retaining sleeve 27 has internal threads to engage threads 28 on the shaft 10 and cooperates with a bushing 29 to confine a suitable O-ring 30 to prevent flow of the high pressure fluid along the shaft. The annular sealing member 16 is backed against a packing ring 31 inside the retaining sleeve 27 and is embraced by an O-ring 32 to prevent leakage of the high pressure fluid past its outer circumferential surface.

The nonrotating sealing member 17 has a bronze facing 33 for contact with the rotating sealing member 16 and is mounted on a fixed sleeve 35 for axial movement relative thereto. The sealing member 17 has a circumferential shoulder 36 for abutment by a suitable helical spring 37 to urge it continuously toward the rotary sealing member 16.

The fixed sleeve 35 provides enough clearance around the rotating shaft 10 to permit the previously mentioned leakage flow to the annular drainage space 20, but has its outer circumference sealed against longitudinal leakage by a pair of O-rings 40. To prevent leakage of the high pressure fluid between the sealing member 17 and the fixed sleeve 35, the sealing member is formed with an internal circumferential groove 41 to retain a suitable sealing ring.

The structure described to this point is more or less conventional and not part of the present invention. The present invention resides in a multiple element sealing ring that is mounted in the groove 41 and is generally designated by numeral 45.

As best shown in Figs. 2 to 6, the multiple element sealing ring 45 comprises three members, namely, an elastomer T-ring 46 and two identical side rings 47 made of low friction material. The T-ring 46 may be made of a synthetic rubber of the butadiene type and preferably is butadiene-styrene copolymer or butadiene-acrylo-nitrile copolymer, sold under the trade name Hycar.

The side rings 47 may be made of a fluorinated polymer or similar material such as polymerized tetrafluoroethylene resin available under the trade name Teflon. We have found that Teflon side rings coact with a smooth metal surface, especially a polished metal surface, with such unexpectedly low coefficient of sliding friction that the side rings may be aptly called self-lubricating rings. Teflon side rings have zero water absorption and are, in effect, nonwettable. Practically all fluids are actually repelled by this synthetic resin and nothing sticks to it with any appreciable strength so that the rings maintain the low coefficient of sliding friction under even the most adverse service conditions.

The T-ring 46 has a relatively thick backing portion 50 that is in the form of a circular band to rest against the bottom of the annular groove 41 and has a central stem portion or radial web portion 51 for sealing contact with the fixed sleeve 35. As may be seen in Fig. 2, this configuration provides two annular recesses 53 on opposite sides of the stem portion 51, which recesses, as may be seen in Fig. 3, are dimensioned to receive the two side rings 47. Thus, the two side rings 47 are of rectangular cross-sectional configuration to fit into recesses of the same cross-sectional configuration, thereby to cooperate with the T-ring 46 to form a composite multiple element sealing ring 45 of rectangular cross-sectional configuration as shown in Fig. 3.

The preferred unrestrained radial dimensions of the T-ring 46 and the two side rings 47 relative to each other and relative to the fixed sleeve 35 may be understood by referring to Fig. 2. The unrestrained inner diameter of a side ring 47, i. e., the inside diameter when the ring is isolated from all other structure is approximately the same as the outside diameter of the fixed sleeve 35, it being contemplated that the two side rings will slip rather easily onto the fixed sleeve 35. In practice the inside diameter of the side rings 47 may be somewhat larger than the outside diameter of the fixed sleeve, the clearance, for example, being on the order of magnitude of .001 inch.

The inside diameter of the stem portion 51 of the T-ring, i. e., the diameter of the cylindrical surface 55 is somewhat less than the outside diameter of the fixed sleeve 35 when the T-ring is unrestrained. Consequently, the material of the T-ring must be stretched to permit the T-ring to embrace the fixed sleeve. Thus, the T-ring embraces the fixed sleeve under circumferential tension that favors close sealing contact between the T-ring and the sleeve.

The inside diameter of the backing portion 50 of the T-ring 46, i. e., the diameter of a cylindrical surface 56, is somewhat smaller than the outside diameter of the two side rings 47 so that the backing portion 50 must be distorted in tension to receive the two side rings. Thus, the T-ring 46 embraces the two side rings 47 with appreciable circumferential tension to promote close contact between the backing portion of the T-rings and the two side rings.

The dimensions of the multiple element sealing ring relative to the dimensions of the groove 41 in which the multiple element sealing ring is to be mounted may be understood by referring to Fig. 4. In Fig. 4 the configuration of the multiple element sealing ring 45 that is shown in broken lines is the configuration that would be assumed were the multiple element sealing ring to be placed around the fixed ring 35 in the absence of the follower 17, as shown in Fig. 3. It will be noted in Fig. 4 that the unrestrained outside diameter of the multiple element sealing ring, and especially the unrestrained outside diameter of the backing portion 50 of the T-ring 46 is greater than the diameter of the cylindrical bottom surface 57 of the groove 41. On the other hand, however, the width of the multiple element sealing ring, and especially the width of the backing portion 50 of the T-ring 46, is appreciably less than the width of the groove 41. As a result of these relative dimensions, mounting the multiple element sealing ring 45 in the groove 41 in contact with the fixed sleeve 35, as shown in Fig. 5, results in placing the multiple element ring under radial compression with slight bulging of the backing portion 50 of the T-ring 46.

The behavior of the mounted multiple element sealing ring in response to fluid pressure of high magnitude in one axial direction may be understood by comparing Fig. 5 which represents the state of the T-ring and the side-rings prior to the application of pressure and Fig. 6 which shows the state of the T-ring and side rings under high pressure.

The previously explained dimensional relationships among the T-ring and the two side rings causes the three elements to interlock and to move together in unison, as if they were a physically integral unit. The high fluid pressure exerted in the direction indicated by the arrows in Fig. 6 causes the resilient yieldable material of the T-ring 46 to transmit pressure in the manner of a fluid against the adjacent surfaces of the groove 41, against the two side rings 47 and against the circumferential surface of the fixed sleeve 35. As a result, the two side rings 47 are contracted into intimate contact with the fixed sleeve 35 and the stem or web portion 51 of the T-ring is placed under sealing pressure against the fixed sleeve.

On the one hand, the stem or web portion 51 of the T-ring 46 is wide enough to provide effective sealing engagement with the sleeve 35 but, on the other hand, is narrow enough to limit the bonding or adhering action of the T-ring with respect to the sleeve so that any bonding effect that develops will not be sufficient to prevent relative sliding action between the multiple element ring and the sleeve in response to relatively low fluid pressure. Thus, if the fluid pressure drops from high magnitude to relatively low magnitude with consequent longitudinal shift among the parts, with special reference to retreat of the follower 17 from the nonrotating annular sealing member 16, the multiple element sealing ring will slide along the fixed sleeve 35 with sufficient freedom to permit the follower to maintain constant sealing contact with the annular sealing member under changing pressure conditions.

In a typical practice of the invention, the following unrestrained dimensions may be used to provide a seal around a sleeve 35 that has an outside diameter of 3.373 inches with a plus tolerance of .001 inch and a negative tolerance of zero. The unrestrained inside diameter of the two side rings 47 will be 3.374 with a plus tolerance of zero and a minus tolerance of .002 inch and the unrestrained outside diameter of the side rings will be 3.562 inches with the same tolerance. It will be noted that the unrestrained inside diameter of the side rings is approximately the same as the outside diameter of the sleeve.

The unrestrained inside diameter of the T-ring 46, i. e., the diameter of the surface 55 in Fig. 2, will be 3.351 inches, which dimension is appreciably less than the outside diameter of the sleeve. The unrestrained inside diameter of the backing portion 50 of the T-member taken at the surface 56 in Fig. 2 will be 3.537 inches, which dimension is appreciably less than the unrestrained outside diameter of the two side rings.

The width of the stem or radial web portion 51 of the T-ring is not greater than approximately one third the width of the backing portion 46 and preferably, as shown in the drawing, is approximately one fifth the width of the backing portion 46, each of the two side rings 47 being approximately two fifths of the width of the backing portion. The exact dimensions specified may be .032 inch for the width of the web portion 51, .062 inch for the width of the two side rings 47 and 0.150 inch for the width of the backing portion 46 of the T-ring. Thus, the combined width of the two side rings together with the radial web portion may be slightly greater than the width of the backing portion 46, since the width of the backing portion is increased in practice by radial compression. In terms of fractions of an inch, the width of the web portion of the ring member may be specified as ½₂ and the width of the two side rings 47 may be specified as ⅟₁₆. The width of the groove 41 in the follower 17 may be 0.180 inch for a multiple element sealing ring of the stated dimensions and to provide for radial compression of the multiple element sealing ring when it is installed in the groove the unrestrained outside diameter of the T-ring may be 3.747.

While the invention has been described as incorporated in the outer of two telescoped cylindrical members, it will be readily appreciated that the invention may alternatively be incorporated in the inner of two telescoping cylindrical members. In such an arrangement, the inner cylindrical member will have a circumferential groove facing radially outward and the configuration of the T-ring will be reversed to direct the stem or radial web portion of the T-ring radially outward. Such construction is shown in Figs. 7 and 8.

Fig. 8 shows an inner cylindrical member 60 which may, for example, be the above-described nonrotating sleeve 35 and an outer cylindrical member 61 which may be the above-described follower 17. The inner member 60 is formed with an outer circumferential groove 62 dimensioned to receive a multiple element sealing ring comprising a T-ring 65 and two side rings 66.

Fig. 7 shows these three elements in unrestrained state adjacent Fig. 8. The unrestrained outside diameter of the web portion 67 of the T-ring 65 is greater than the inside diameter of the outer member 61 so that the T-ring presses radially outward into sealing contact with the member 61. The unrestrained outside diameter of each of the side rings 66 is approximately the same as the inside diameter of the outer member 61, but the unrestrained outside diameter of the two cylindrical surfaces 68 of the T-ring is greater than the unrestrained inside diameter of the two side rings 66 so that the T-ring tends to expand the two side rings radially outward into contact with the inner cylindrical surface of the outer member 61.

The unrestrained inside diameter of the T-ring 65 is less than the outside diameter of the cylindrical bottom surface 69 of the groove 62 so that the T-ring 65 is compressed radially between the bottom of the groove and the outer member 61. The groove 62 is wider than the three element sealing ring to permit the backing portion 70 of the T-ring 65 to bulge as shown in Fig. 8. Thus, while the second form of the invention shown in Fig. 8, is a reversal of the first described form, the same basic dimensional relationships are used to create the same sealing action.

Our description in specific detail of preferred practices of the invention will suggest to those skilled in the art various changes, substitutions and other departures from our disclosure that properly lie within the spirit and scope of the appended claims.

We claim as our invention:

1. A multiple element sealing ring for a high pressure sealing assembly around a shaft to seal the annular space between a nonrotating sleeve member surrounding the shaft and a nonrotating follower member surrounding the sleeve, said multiple element sealing ring being adapted for mounting in an inner annular groove in said follower member and being characterized by axial slidability to permit said follower to move freely axially against a cooperating rotary sealing member on said shaft in response to fluid pressure even after the follower has been stationary for a long period of time, said multiple element sealing ring comprising: an elastomer T-ring having an annular backing portion to seat against the cylindrical bottom surface of said groove and a central relatively thin radial web portion for contact with said sleeve, said two portions forming two annular recesses on opposite sides of the T-ring; and two side rings of a fluid-impervious material having a low coefficient of friction lying against the opposite faces of said web portion and against said backing portion in said two annular recesses, respectively, to prevent extrusion of the elastomer and to limit the area of the elastomer in contact with said sleeve, said T-ring and side rings being in continuous engagement with each other to shift in said groove as a unit, the unrestrained inside diameter of said backing portion of said T-ring being less than the unrestrained outside diameters of said two side rings.

2. A combination as set forth in claim 1 in which the unrestrained inside diameter of said T-ring is less than the outside diameter of said sleeve and in which the unrestrained outside diameter of the T-ring is greater than the diameter of the cylindrical bottom surface of said groove, whereby the T-ring is compressed between said sleeve and the bottom of the groove.

3. A combination as set forth in claim 2 in which the unrestrained inside diameter of said side rings is approximately the outside diameter of said sleeve member.

4. A combination as set forth in claim 1 in which said side rings are made of tetrafluoroethylene.

5. A combination as set forth in claim 4 in which said side rings are made of polytetrafluoroethylene.

6. A multiple element sealing ring for high pressure sealing assembly around a shaft to seal the annular space between a nonrotating sleeve member surrounding the shaft and a nonrotating follower member surrounding the sleeve, said multiple element sealing ring being adapted for mounting in an annular groove on the inner circumference of said follower member and being characterized by axial slidability to permit the follower member to move freely axially relative to the sleeve member against a cooperating rotary sealing member on said shaft in response to fluid pressure even after the follower has been stationary for a long period of time, said multiple element sealing ring comprising: an elastomer T-ring having an annular backing portion to seat against the bottom of said groove in said follower and a central relatively thin radial web portion for contact with said sleeve member, said two portions forming two annular recesses on opposite sides of the T-ring, said backing portion of the T-ring having an unrestrained width narrower than said groove, said T-ring having an unrestrained inner diameter less than the outside diameter of said sleeve member and having an unrestrained outside diameter greater than the diameter of the cylindrical bottom surface of said groove, whereby the T-member is compressed radially between the sleeve member and the cylindrical bottom of the groove; and two side rings of polytetrafluoroethylene lying against the opposite faces of said web portion and against said back portion in said two annular recesses, respectively, to prevent extrusion of the elastomer and to limit the area of the elastomer in contact with said sleeve member, the inner diameter of said two side rings being on the order of magnitude of the outside diameter of said sleeve member and the outside diameter of the two side rings being greater than the inside diameter of said backing portion of the T-ring.

References Cited in the file of this patent

UNITED STATES PATENTS

| 1,339,599 | Garren | May 11, 1920 |
| 1,612,038 | Miller | Dec. 28, 1926 |
| 2,349,170 | Jackman | May 16, 1944 |
| 2,467,312 | Jack | Apr. 12, 1949 |